(12) United States Patent
Faccin et al.

(10) Patent No.: US 7,623,447 B1
(45) Date of Patent: *Nov. 24, 2009

(54) TELEPHONY SERVICES IN MOBILE IP NETWORKS

(75) Inventors: Stefano Faccin, Dallas, TX (US); Tuija Hurtta, Espoo (FI); Jaakko Rajaniemi, Helsinki (FI); Herman Huang, Plano, TX (US); Risto Kauppinen, Helsinki (FI); Janne Muhonen, Helsinki (FI); Veijo Vanttinen, Espoo (FI); Jan Kall, Espoo (FI); Serge Haumont, Helsinki (FI); Jari Syrjala, Vantaa (FI)

(73) Assignee: Nokia Corporation, Espoo (FI)

( * ) Notice: Subject to any disclaimer, the term of this patent is extended or adjusted under 35 U.S.C. 154(b) by 1659 days.

This patent is subject to a terminal disclaimer.

(21) Appl. No.: 09/709,716

(22) Filed: Nov. 13, 2000

Related U.S. Application Data

(63) Continuation-in-part of application No. 09/546,207, filed on Apr. 10, 2000, and a continuation-in-part of application No. 09/546,208, filed on Apr. 10, 2000.

(51) Int. Cl.
*H04L 1/00* (2006.01)
(52) U.S. Cl. .................. 370/230; 455/456.1; 455/404.1; 370/235; 370/328
(58) Field of Classification Search ............... 455/404.1, 455/404.2, 432.1, 456.1, 456.2, 456.3, 456.5, 455/456.6
See application file for complete search history.

(56) References Cited

U.S. PATENT DOCUMENTS 5,388,147 A * 2/1995 Grimes .................... 455/404.2
5,890,061 A 3/1999 Timm et al.
6,317,421 B1 11/2001 Wilhelmsson et al.

(Continued)

FOREIGN PATENT DOCUMENTS

DE 19748231 A1 5/1999

(Continued)

OTHER PUBLICATIONS

Samsun Electronics Co., Ltd, "Architecture model for Release 2000", Technical Specification Group Services and System Aspects, Mar. 17, 2000; pp. 1-65.

(Continued)

*Primary Examiner*—Temica M Beamer
(74) *Attorney, Agent, or Firm*—Banner & Witcoff, Ltd.

(57) ABSTRACT

An emergency telephone call is supported and routed to a Public Safety Answering Point (PSAP) in an IP based packet switched wireless communications network. An activate PDP context request is sent from a user equipment to the network. A parameter in the activate PDP context request indicates that the PDP context will be used to transfer an emergency call. An activate PDP context accept message is returned from the support node to the user equipment. The activate PDP context accept message acknowledges the activate PDP context request message and provides the address of a call state control function. A call setup request transferred to the call state control function includes the Service Area Identity (SAI). The call state control function selects a PSAP based, at least in part, on the SAI included in the call setup request and forwards the emergency call to the selected PSAP.

34 Claims, 10 Drawing Sheets

U.S. PATENT DOCUMENTS

| | | | |
|---|---|---|---|
| 6,415,018 B1 | 7/2002 | Antonucci et al. | |
| 6,415,151 B1 | 7/2002 | Kreppel | |
| 6,418,128 B1 | 7/2002 | Takagi et al. | |
| 6,463,055 B1 | 10/2002 | Lupien et al. | |
| 6,532,225 B1 | 3/2003 | Chang et al. | |
| 6,590,905 B1 | 7/2003 | Suumaki et al. | |
| 6,594,241 B1 | 7/2003 | Malmlof | |
| 6,677,894 B2* | 1/2004 | Sheynblat et al. | 342/357.1 |
| 6,703,971 B2* | 3/2004 | Pande et al. | 342/357.09 |
| 6,741,863 B1* | 5/2004 | Chiang et al. | 455/456.1 |
| 6,819,929 B2* | 11/2004 | Antonucci et al. | 455/445 |
| 7,298,697 B2* | 11/2007 | Hurtta | 370/230 |
| 2001/0036175 A1* | 11/2001 | Hurtta | 370/352 |
| 2004/0002348 A1* | 1/2004 | Fraccaroli | 455/456.3 |
| 2004/0033795 A1* | 2/2004 | Walsh et al. | 455/404.1 |

FOREIGN PATENT DOCUMENTS

| | | |
|---|---|---|
| EP | 0789498 | 8/1997 |
| JP | 07/154863 | 6/1995 |
| JP | 09/084132 | 3/1997 |
| JP | 9-233562 A | 9/1997 |
| JP | 11/088433 | 3/1999 |
| JP | 11/234727 | 8/1999 |
| JP | 11/331937 | 11/1999 |
| WO | 99/05828 A1 | 2/1999 |
| WO | 99/20071 | 4/1999 |
| WO | 9921380 | 4/1999 |
| WO | WO 99/37103 | 7/1999 |
| WO | 0007393 | 2/2000 |
| WO | 00/21318 | 4/2000 |
| WO | 0019743 | 4/2000 |
| WO | 00/36860 | 6/2000 |
| WO | 00/51374 | 8/2000 |
| WO | 02/069663 A1 | 9/2002 |

OTHER PUBLICATIONS

Japanese Office Action with English Translation from Japanese Patent Application No. 2002-506993 dated Apr. 8, 2009, 8 pages.
English translation of Japanese Office Action dated May 22, 2006 re Patent Appln. No. 2002-506993, 7 pages.

* cited by examiner

200
TELEPHONY SERVICES IN MOBILE IP NETWORKS

CROSS-REFERENCE TO RELATED APPLICATIONS

This application is a continuation-in-part of U.S. patent application Ser. No. 09/546,207 and of U.S. patent application Ser. No. 09/546,208, both of which were filed on Apr. 10, 2000 and which hereby have their disclosures incorporated by reference into this application.

BACKGROUND

1. Field of the Invention

The present invention relates generally to methods and systems providing telephony communications through packet-switched communication networks. Particular aspects of the invention relate to location-based services in Internet Protocol (IP) based packet switched mobile communication networks, a method of making location-based services available to network subscribers when roaming between or within such communication networks, and the support and routing of emergency calls in such communication networks.

2. Discussion of the Related Art

Communications services have historically been provided over circuit-switched networks such as the Public Switched Telephone Network (PSTN), but now they can also be provided over packet switched networks, such as the Internet. These packet-switched networks are commonly referred to as IP networks because the Internet Protocol is the most commonly used primary protocol. Many modern wireless networks utilize a combination of telephony equipment (such as conventional cellular phones) and packet switched equipment (usually network traffic routing equipment) compliant with one or more IP telephony standards such as, for example, the International Telecommunications Union (ITU) H.323 standard or the Internet Engineering Task Force (IETF) Session Initiation Protocol (SIP) specification, RFC 2543.

There have been several proposals for a new $3^{rd}$ generation of IP based mobile networks in which the user equipment (UE) as well as the network equipment (NE) is compliant with one or more IP standards for packet switched networks. However, when providing voice call services, such Mobile IP Telephony (MIPT) networks have several problems which are not present in conventional $2^{nd}$ generation cellular networks. For example, while cellular subscribers can often roam between $2^{nd}$ generation cellular networks, it is difficult for IP Telephony (IPT) subscribers of MIPT networks to easily access the same services available in their home network when they are visiting in other networks.

There is, for example, the Mobile IP Protocol to enable mobility. As an example, it is possible that an IPT subscriber, with General Packet Radio Service (GPRS) access in the visited network (see 3G TS 23.060, Stage 2, version 3.3.0), uses voice call services in their home network, so the subscriber is registered in a call control entity (such as a call state control function (CSCF)) in the home network. However, for certain services, such as emergency 911 calls, it is necessary to use voice call services in the visited network and to provide location-based services for successful implementation. Therefore, there is a need for a technique that allows roaming IPT subscribers to easily access and utilize location-based services, and to make emergency calls, in MIPT networks.

In particular, when an emergency call setup request is received by a call control entity in a $2^{nd}$ generation cellular network, it selects a Public Safety Access Point (PSAP) to route the call to based on the Cell ID or the location information provided during the call setup. However, this method cannot always be performed in $3^{rd}$ generation mobile IP networks based on the UMTS standard, since the Cell ID or location information may not always be available to a call control entity due to the way the emergency calls are setup. Therefore, there needs to be a method to support the selection of the PSAP in 3rd generation mobile IP networks based on the UMTS standard.

BRIEF SUMMARY

The present invention addresses the disadvantages of MIPT networks discussed above. It broadly relates to systems and methods of providing, initiating, accessing, utilizing or managing location-based services and/or emergency calls in a $3^{rd}$ generation Mobile IP Telephony network. One application of the invention relates to a service in which a subscriber visiting a network other than their own network uses their mobile terminal to make an emergency call. The emergency call is connected to a CSCF which then forwards the emergency call to a PSAP without authentication or billing and the approximate geographic location of the subscriber is transferred to the CSCF or to the PSAP at the same time that the emergency call is connected.

The example embodiments of the invention offer a selection mechanism which provides controlled access to the CSCF of a local network so that an emergency call can be easily set up. When the emergency call is initiated, a Gateway GPRS Service Node (GGSN) provides the address of a Call State Control Function (CSCF). An emergency call setup request is sent to the Call State Control Function (CSCF). The emergency call setup request includes the Service Area Identification (SAI) of GPRS. The CSCF selects a Public Safety Answering Point (PSAP) to route the call to, based at least in part on the Service Area Identity, and forwards the emergency call to the selected PSAP without authentication or billing. Preferably, the approximate geographic location of the subscriber is transferred to the CSCF or to the PSAP at the same time that the emergency call is connected. It thus becomes possible to make an emergency call without a Subscriber Identification Module (SIM) and without any charges. The access network in the example embodiments is able to control the PDP contexts which are used for emergency calls so that they can't be misused or that they are not subject to fraud.

DETAILED DESCRIPTION

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation, the spirit and scope of the present invention being set forth by the claims in the patent issuing from this application.

Figure 1:
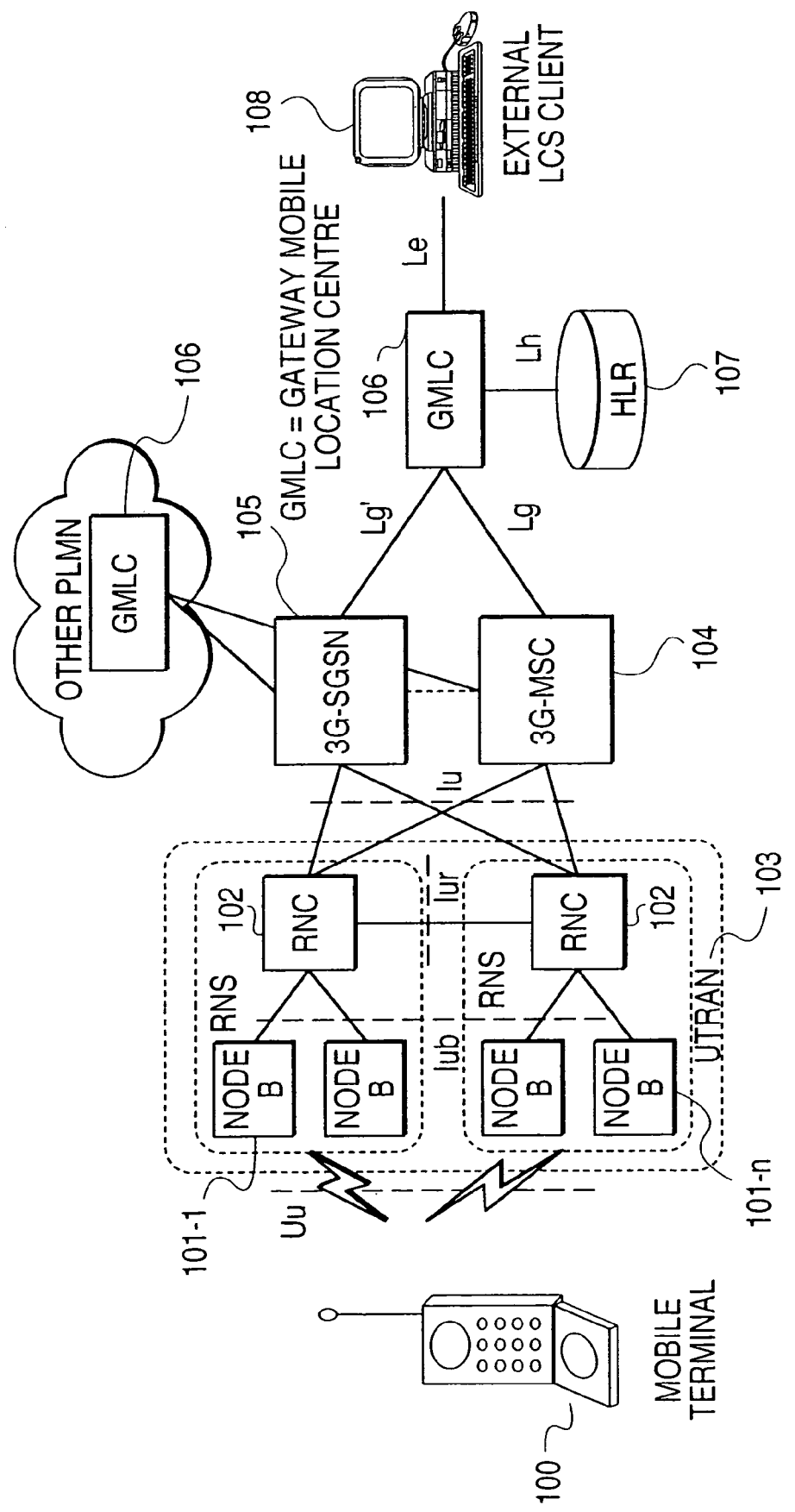
FIG. 1 is a block diagram showing parts of the architecture of an example embodiment $3^{rd}$ generation Mobile IP Telephony network.

FIG. 1 is a block diagram of a typical $3^{rd}$ generation Mobile IP Telephony network based on the UMTS standard. The detailed technical specifications for a UMTS network have been published by the $3^{rd}$ Generation Partnership Project in Release 1999 (www.3gpp.org). The blocks in FIG. 1 represent different functionalities and do not necessarily correspond to different discrete network elements or equipment.

The location services are supported by elements throughout the network. Some services are embedded in conventional network elements, such as the Radio Network (Controller (RNC), Mobile Services Switching Center (MSSC) and Service GPRS Support Node (SGSN). In addition, some new network elements and interfaces are provided to support location services.

One new functionality element in the network is the Location Measurement Unit (LMU), which may or may not be integrated (LMU is not shown in FIG. 1, but is included as element 301 in FIG. 3) within each one of Base Station Subsystems (BSS) in Node B 101-1 to Node B 101-n, preferably without technical restrictions, at least when an Idle Slot Forward Link-Time Difference of Arrival (ISFL-TDOA) positioning method is used. LMU 301 primarily measures the Real Time Differences (RTD), Absolute Time Difference (ATD), or any other kind of radio interface timing of the signals transmitted by the base stations. These assistance measurements obtained by the LMU 301 are generic status information and can be used by more than one positioning method. The measurements may consist of location measurements specific to one mobile used to compute the location of that mobile or assistance measurements specific to all mobiles in a certain geographic area.

All location, timing difference and assistance measurements obtained by LMU 301 are supplied to a particular Serving RNC 102 (SRNC) associated with the base station having the functionality of LMU 301. Instructions concerning the timing, the nature and any periodicity of those measurements are either provided by the SRNC 102 or are pre-administered in the base station.

In GSM location services, the LMU is a separate element from the GSM network. The communication between the GSM network and LMU is done through the GSM air interface. In the UMTS location services, the LMU functionality is integrated into the base station, preferably without technical restrictions, at least when an Idle Slot Forward Link-Time Difference of Arrival (ISFL-TDOA) method is used.

The Mobile Terminal (MT) 100 may be involved in various levels in the positioning procedures depending on the positioning method employed. In addition, the role of MT 100 is closely related to the positioning approach used in the system. For example, the functionality of MT 100 may or may not encompass location calculation. Preferably, it can initiate a location service by making a request to the network for positioning (network assisted positioning). If it supports the use of Idle Slot Downlink (IS-DL) sets, then it also performs the following functions:

1) measures and stores the signal during idle periods;
2) correlates with different BCH codes between the idle periods;
3) determines the arrival time of the first detectable path, both for the serving Base Station Subsystem (BSS) and other BSSs that it detects;
4) determines when the idle period occurs; and
5) reports the results back to the network.

Each Node-B is able to shut down transmission during the idle period. This function can be predefined in Node B or can be controlled by the corresponding RNC 102. Each Node-B also can handle the functionality of LMU 301 including the functionality of the Positioning Signal Measurement Function (PSMF) and Location System Operation Function (LSOF). Thus, it is responsible for gathering uplink/downlink radio signal measurements for calculation of a mobile's position. It is also involved in overall operating of location services in the network.

The SRNC 102 in the Universal Terrestrial Radio Access Network (UTRAN) 103 contains functionality required to support location services and procedures between LMU 301 and location service entities in one Public Land Mobile Network (PLMN). It preferably controls the TDOA IS-DL procedures periodically or according to predetermined parameters, handles each Node-B's power ceasing period and performs the Location System Operation Function (LSOF), Positioning Radio Coordination Function (PRCF), Power Calculation Function (PCF), and Positioning Radio Resource Management (PRRM) entities. This includes provisioning of data, positioning capabilities, location services operation, location calculation, gathering uplink or downlink radio signal measurements for mobile position calculation, managing the positioning of a mobile through overall coordination, reservation and scheduling of resources (including Forward Access Channel/Random Access Channel (FACH/RACH) or Dedicated Channel (DCH)) required to perform positioning measurements of a mobile terminal 100, and controlling the location services radio accesses. SRNC 102 also calculates the final location estimate and accuracy.

The SRNC 102 controls each LMU 301 of a number of LMUs for the purpose of obtaining radio interface measurements to locate or help locate MT 100 in the area that it serves. The SRNC 102 is administered with capabilities and types of measurements produced by each of its LMUs. The location measurements returned by an LMU 301 to an SRNC 102 have a generic status and can be used for more than one positioning method (including Time of Arrival (TOA)).

Signaling between an SRNC 102 and each LMU 301 is transferred via the Iub interface, and in some specific periods, via Iur interfaces. The Iur interface supports inter-RNC soft handovers, including location services. Whenever an inter-RNC soft handover occurs Iur supports the functionality of the positioning entities in RNCs, including PCF, PRRM, Positioning Signal Measurement Function (PSMF) and LSOF. In case of SRNC relocation, Iur supports the relocation mechanisms to transfer the PCF, PRRM, PSMF and LSOF functionality from SRNC to Drift RNC (DRNC) in order for DRNCs to be able to handle the responsibility of SRNC in location service processes.

UTRAN 103 is involved in the handling of various positioning procedures and RAN level overall controlling of location services. It controls an Idle Slot Downlink (IS-DL) method and manages overall coordination and scheduling of resources required to perform positioning of the mobile. In a network based positioning approach, UTRAN 103 calculates the final location estimate and accuracy and controls a number of LMU/Node B101-1 to 101-*n* for the purpose of obtaining radio interface measurements to locate or help locate mobile terminal 100 in the serving area.

Generally, UTRAN 103 provides Cell-ID and timing related data to 3G-MSC 104. The 3G-MSC 104 is similar to the MSC in a GSM network, but the functionality of the Serving Mobile Location Center (SMLC) (element 302 in FIG. 3) may be integrated into SRNC 102. The functions of 3G-MSC 104 are billing, coordination, location requests, authorizations of mobile terminals and managing call-related and non-call related positioning requests and operations for location services.

Since 3G-SGSN 105 has independent mobility management, UTRAN 103 instead provides a Cell-ID to SGSN 105. The location services parameters are included in the Iu interface between RNCs 102 and 3G-MSC 104 and 3G-SGSN 105. 3G-SGSN 105 is similar to MSC 104. The functions of SGSN 105 are charging, coordination, authorizations of mobile terminals and managing positioning requests and operations of the location services as far as the packet switch accesses are concerned. If mobile terminals 100 support both network-based and mobile-based positioning, each RNC 102 calculates the position of each mobile terminal 100 when a mobile-based positioning is applied by gathering uplink/downlink (UL/DL) radio signal measurements. Then RNC 102 sends the location information to the UE or to SGSN. If the SGSN 105 receives the location information, it sends the location information to CSCF (element 304 in FIG. 3), to the PSAP (element 305 in FIG. 3), or to GMLC 106.

The Iu interface transforms coordinate estimates of Mobile Terminal 100 over Radio Access Network Application Part (RANAP) protocol from each RNC 102 to 3G-MSC 104 and SGSN 105 and Mobile Terminal 100 positioning related NAS messages, including paging, authentication, etc. messages over RANAP protocol. The interface also maps the location service Quality of Service (QoS) attributes and handles states information between UTRAN 103 and 3G-MSC 104.

In a situation where Mobile Terminal 100 is connected to an external server via IP, the server might want to locate Mobile Terminal 100. If Mobile Terminal 100 is using dynamic IP addressing, the address has to be translated to an understandable address or the location request has to be otherwise processed.

The external server could request the GGSN (element 303 in FIG. 3) to provide the identity behind the given dynamic IP address. The GGSN 303 can map the dynamic IP address to a MS-ISDN number, which is used by the external server to locate Mobile Terminal 100 via normal positioning methods. Alternatively, an IP port number can be reserved for allocation request use in Mobile Terminal 100. The external application can then use the dynamic IP address and known (standardized) port number to deliver a positioning request to Mobile Terminal 100. Mobile Terminal 100 then requests its own position via normal positioning procedures, and delivers the result to the external terminal.

Another entirely new functional block is the Gateway Mobile Location Center (GMLC) 106, which acts as a gateway between Location Service (LCS) clients, such as PSAP 305, and the rest of the network. GMLC 106 receives and handles service requests for location information for an indicated mobile terminal 100 from external LCS clients, activates the location systems, if needed, and returns the result to the LCS client. GMLC 106 may request routing information from HLR 107 or SGSN 104. After performing registration authorization, it sends a positioning request to and receives final location estimates from 3G-MSC 105 and SGSN 104.

Home Location Register 107 contains location services subscription data and routing information concerning subscriber calls. HLR 107 is accessible from GMLC 106 via a Mobile Application Part (MAP) interface.

PSAP 305 is preferably a conventional PSAP and may be connected to GMLC 106 via the PSTN. The external LCS client(s) 108 may be any sort of service application offered by a service provider or content provider. LCS Client(s) 108 is closely related to the variety of available services. Sometime Mobile Terminal 100 or a service application in Mobile Terminal 100 is the client.

In addition to changes in the main interfaces (i.e., Uu, Iub, Iur and Iu) of the network, there are also some interfaces defined to support location services. The Le interface provides the reference point for transforming information transferred between GMLC 106 and PSAP 305 and other external LCS clients 108. This information includes the positioning request and the final result of the positioning process.

The Lh interface passes routing information from HLR 107 to GMLC 106 and supports any mobility management related database in HLR 107. It can also be used by GMLC 106 to request the address of a visited MSC or SGSN for a particular Mobile Terminal 100 whose location has been requested. It is preferably a type of MAP interface and may be implemented over a SS7 signaling network or possibly over IP protocol (MAP over IP). The Lg interface allows 3G-MSC 105 to access GMLC 106 (Home PLMN or Visited PLMN). The interface transforms subscriber information needed, for example, for authorization and positioning access routing. It can be used by GMLC 106 to convey a location request to the MSC or SGSN currently serving a particular Mobile Terminal 100 whose location was requested or by an MSC or SGSN to return location results to GMLC 106. It is preferably a type of MAP interface and may be implemented over a SS7 signaling network or possibly over IP protocol (MAP over IP).

The Lg interface allows SGSN 104 to access GMLC 106 (Home PLMN or Visited PLMN). It may be identical to the Lg interface, but is labeled differently in FIG. 1 to show that it may also be different. The interface transforms subscriber information needed, for example, for authorization and positioning access routing. It is preferably a type of MAP interface and may be implemented over a SS7 signaling network or possibly over IP protocol (MAP over IP). Preferably, the MAP interfaces are as similar as possible to the MAP interfaces defined for location services in the GSM network. Because there is no Serving MLC (SMLC) in UMTS, the MAP interface between SMLC and VMSC is not needed. The locations services for GSM do not yet include GPRS, so the GPRS part of the UMTS network is added to the MAP signaling. It is feasible to use the same MAP interface between GMLC 106 and 3G-SGSN 105, and between GMLC 106 and 3G-MSC 104.

Figure 2:
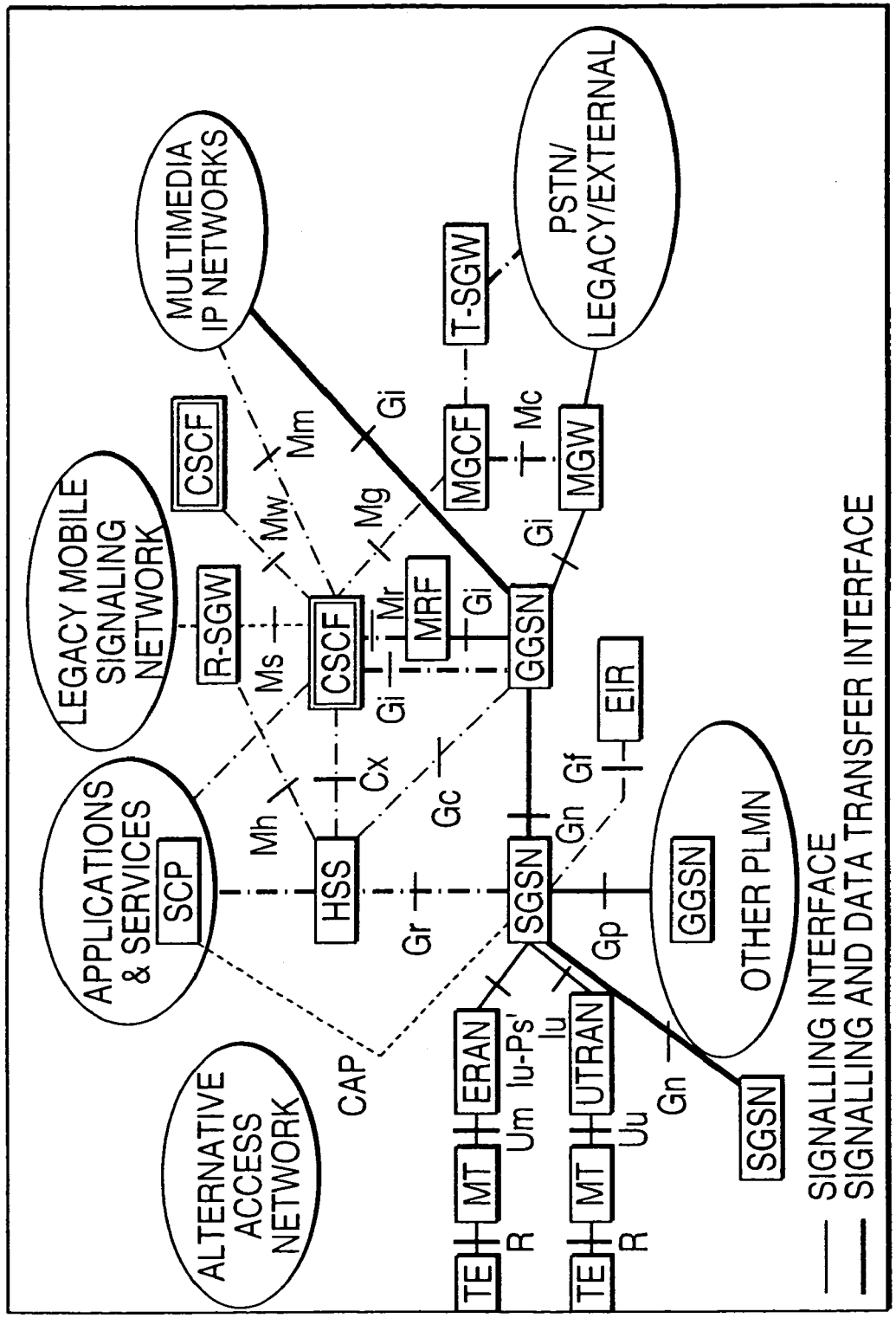
FIG. 2 is an expanded block diagram of an example $3^{rd}$ generation IP network additionally showing connections to other networks.

FIG. 2 is an additional block diagram showing connections to other networks and, in particular, the Gateway GPRS Support Node (GGSN) 108 and Call State Control Function (CSCF) 109.

Figure 3:
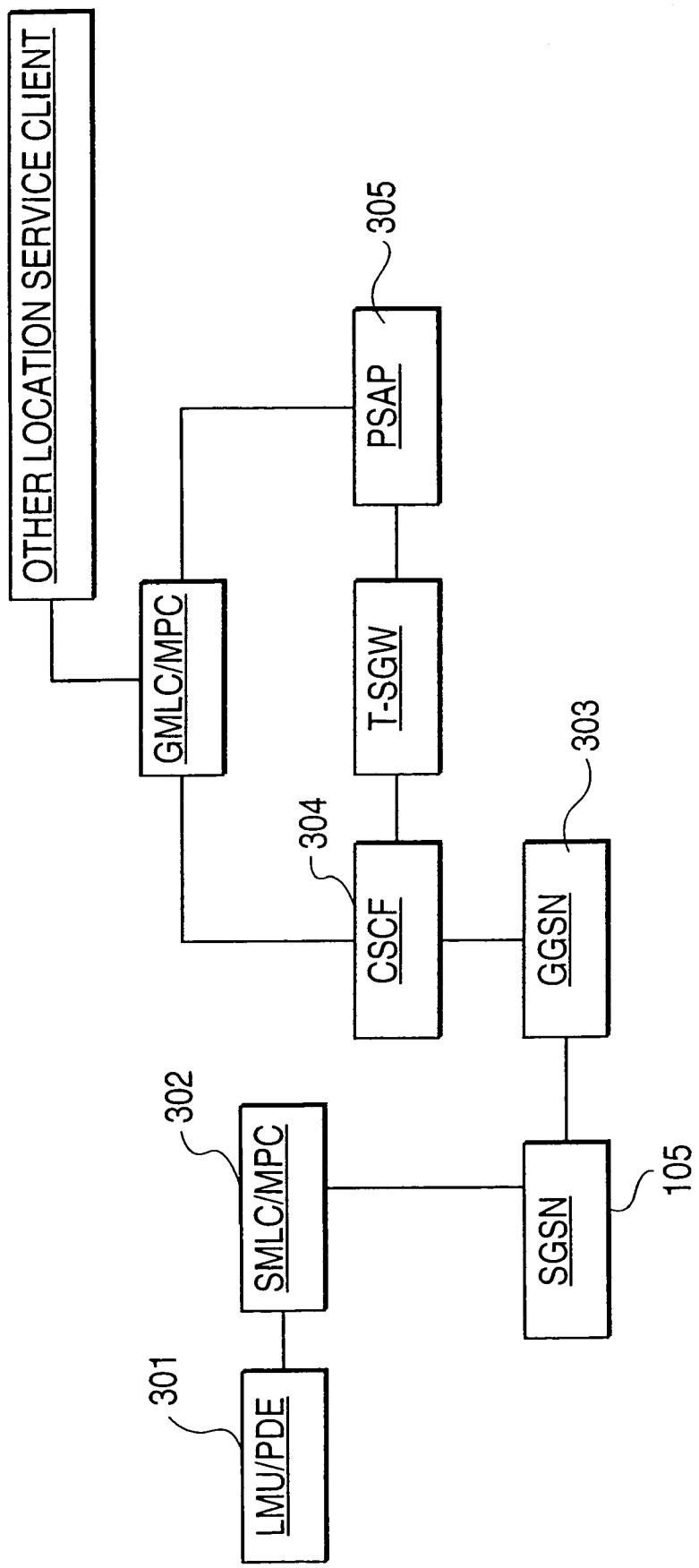
FIG. 3 is a simplified block diagram depicting an example of location service entities and components of a $3^{rd}$ generation Mobile IP Telephony network according to example embodiments of the invention.

FIG. 3 is a simplified block diagrams showing the connections between network element functionalities and, in particular, the Gateway GPRS Support Node (GGSN) 303 and Call State Control Function (CSCF) 304. There is also shown in FIG. 3, the Public Safety Answering Point PSAP) 305 to which emergency calls are connected through CSCF 304 according to the example method embodiments described below.

GGSN 303 and CSCF 304 are instrumental in implementing the example mechanisms illustrated in FIGS. 4-11 for reliably transferring emergency calls to an appropriate PSAP without abuse or fraud. In the following description of the example embodiments, GGSN 303 and CSCF 304 are elements located in a network in which a subscriber is visiting. They utilize a signaling PDP context supported in 3rd generation MIPT networks. Although not shown in FIGS. 1-3 for the sake of clarity, it should be understood that there may be a plurality of different CSCFs and connected PSAPS. Preferably, each CSCF 304 maintains a database of the connected PSAPs (or equivalent capability) which includes a correspondence between the PSAPs for each Service Area Identification (SAI) code it may receive for an emergency call such as in one of the example method embodiments described below. When a CSCF receives an SAI code in an emergency call setup request, it connects the emergency call to a PSAP based, at least in part, on the correspondence between the SAI code and the PSAPs stored in the database. The selection of an appropriate PSAP by CSCF may ultimately be effected by other factors in addition to the SAI code. For example, load balancing or other procedures may effect the selection of a PSAP in order to attempt to ensure that the emergency call can be promptly answered at the PSAP to which it is connected.

The specifications for a UMTS network have been released by the 3rd Generation Partnership Projection (www.3gpp.org). Release 1999 provides that a network subscriber can have one or more packet data protocol (PDP) addresses. The General Packet Radio Service (GPRS) Service Description, Stage 2, 3G TS 23.060, Version 3.3.0, is hereby incorporated by reference. Each PDP address is described by one or more PDP contexts in the Mobile Terminal (MT) 100, SGSN 105, and GGSN 303. Each PDP context may have forwarding and mapping information for directing the transfer of data to and from its associated PDP address and a traffic flow template (TFT) for filtering the transferred data.

Each PDP context can be selectively and independently activated, modified and deactivated. The activation state of a PDP context indicates whether or not data transfer is enabled for a corresponding PDP address and TFT. If all PDP contexts associated with the same PDP address are inactive or deactivated, then all data transfer for that PDP address is disabled. All PDP contexts of a subscriber are associated with the same Mobility Management (MM) context for the International Mobile Subscriber Identity (IMSI) of that subscriber.

While network support for location services has been described above, the invention is not dependent on any particular positioning method and can be used generically with any standardized or proprietary positioning method. Preferably, the positioning methods and network location services capabilities used in the example embodiments of the invention for supporting and routing an emergency call to a PSAP are the same positioning methods and network location services capabilities used for other location services clients. A number of different method embodiments, differing primarily in their positioning process, are described below with reference to the architecture of the network shown in FIGS. 1 and 3. These method embodiments are merely non-limiting illustrative examples and the network is merely a non-limiting illustrative example of a network in which the method embodiments may be practiced. Of course, there may be other method embodiments and other networks in which the methods may be carried out.

Figure 4:
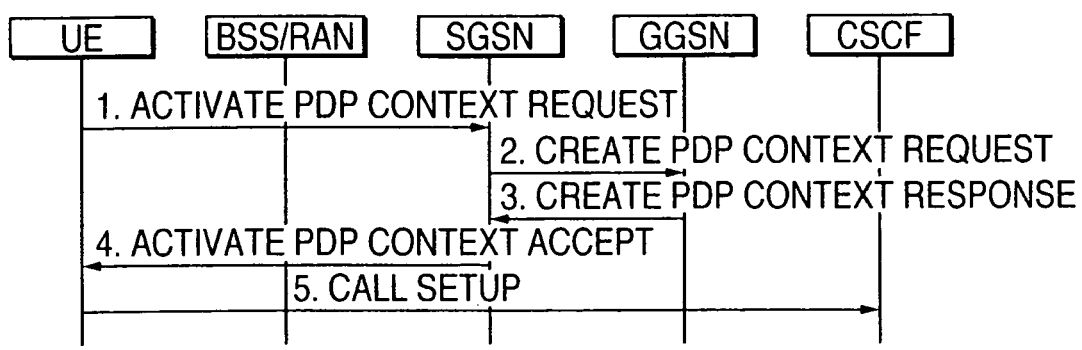
FIG. 4 is a general signaling diagram of an example embodiment of the invention in which an emergency call is made by a subscriber with a Subscriber Identification Module (SIM).

FIG. 4 shows the application of the PDP context activation procedure of the UMTS network in a example embodiment of the invention where a subscriber has a Subscriber Identification Module (SIM). First, Mobile Terminal 100 initiates a PDP context activation. For example, the subscriber may dial 9-1-1. The Activate PDP Context Request sent to SGSN 105 in step 1 includes a number of parameters. These parameters include a PDP address and an Access Point Name (APN). The PDP address is used to indicate whether a static PDP or dynamic PDP address is required. The APN is conventionally a logical name referring to the GGSN to be used. The GGSN is a gateway to connected external networks. In this example embodiments of the invention, the APN is instead used to indicate that the service required is an emergency call.

In step 2, SGSN 105 selects a suitable GGSN 303 according to the APN and sends a Create PDP Context Request message to the selected GGSN 303. GGSN 303 decides whether to accept or reject the request. If it accepts the request, GGSN 303 sets a traffic flow template (TFT) to allow only emergency call related traffic to be transferred on the PDP context. For example, a separate IP address or port number may be used for normal calls and for emergency calls, and GGSN 303 can set the TFT according to the information on the IP address or the port number.

If GGSN 303 accepts the request, it modifies its PDP context table and returns a Create PDP Context Response message to SGSN 105 in step 3. It includes the address of a suitable CSCF 304 in the Create PDP Context Response. Preferably, the address of CSCF 304 is sent in the Protocol Configuration Options parameter, but it can also be sent in another parameter or as a new parameter.

If the address of CSCF 304 is present in the Create PDP Context Response, SGSN 105 copies it to an Activate PDP Context Accept message relayed to MT 100 in step 4. MT 100 must contact the CSCF 304 specified in step 4. MT 100 may send location information to CSCF 304 in step 5. If for some reason the address of CSCF 304 is not sent to MT 100, then the GGSN 303 may need to change the destination IP address in the call setup message in order to use a local CSCF for the emergency call. This is shown as step 5 in FIG. 4. For the actual voice traffic, a secondary PDP context with correspondingly different Quality of Service (QoS) may be needed. If needed, MT 100 initiates a secondary PDP context activation.

Preferably, the call setup request sent in step 5 of FIG. 4 includes the Service Area Identification (SAI) of MT 100. The Service Area Identification is used to uniquely identify an area consisting of one or more cells belonging to the same location area and to indicate the location of MT 100. The Service Area Code (SAC) together with the PLMN identity and the LAC constitutes the Service Area Identification: SAI=MCC+MNC+LAC+SAC. See the General Packet Radio Service (GPRS) Service Description, Stage 2, Release 1999, 3G TS 23.060, Version 3.3.0, Section 14.10. CSCF 304 uses the SAI code, at least in part, to select an appropriate PSAP to which to connect the emergency call.

Figure 5:
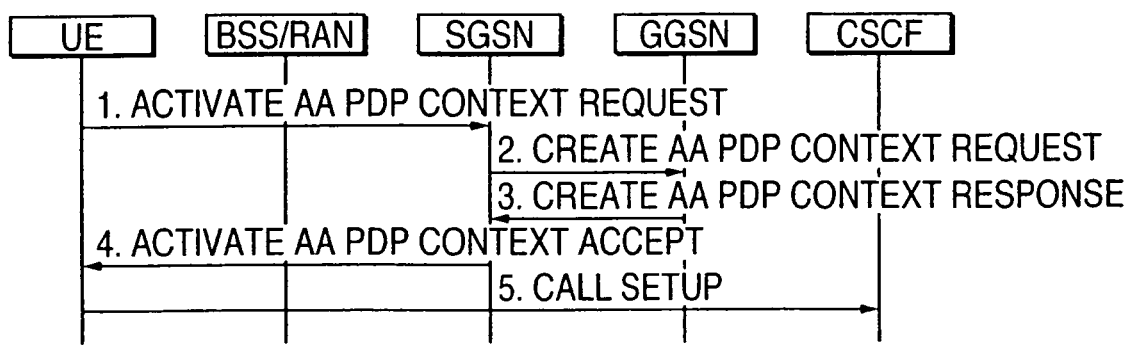
FIG. 5 is a general signaling diagram of an example embodiment of the invention in which an emergency call is made by a subscriber without a Subscriber Identification Module (SIM).

The example embodiment in FIG. 5 is substantially the same as that set forth above with respect to FIG. 4 except that it is carried out for a subscriber without a Subscriber Identification Module (SIM). In this case, the UE sends an Activate Anonymous Access (AA) PDP Context Request. The rest of the procedure is in FIG. 4.

Figure 6:
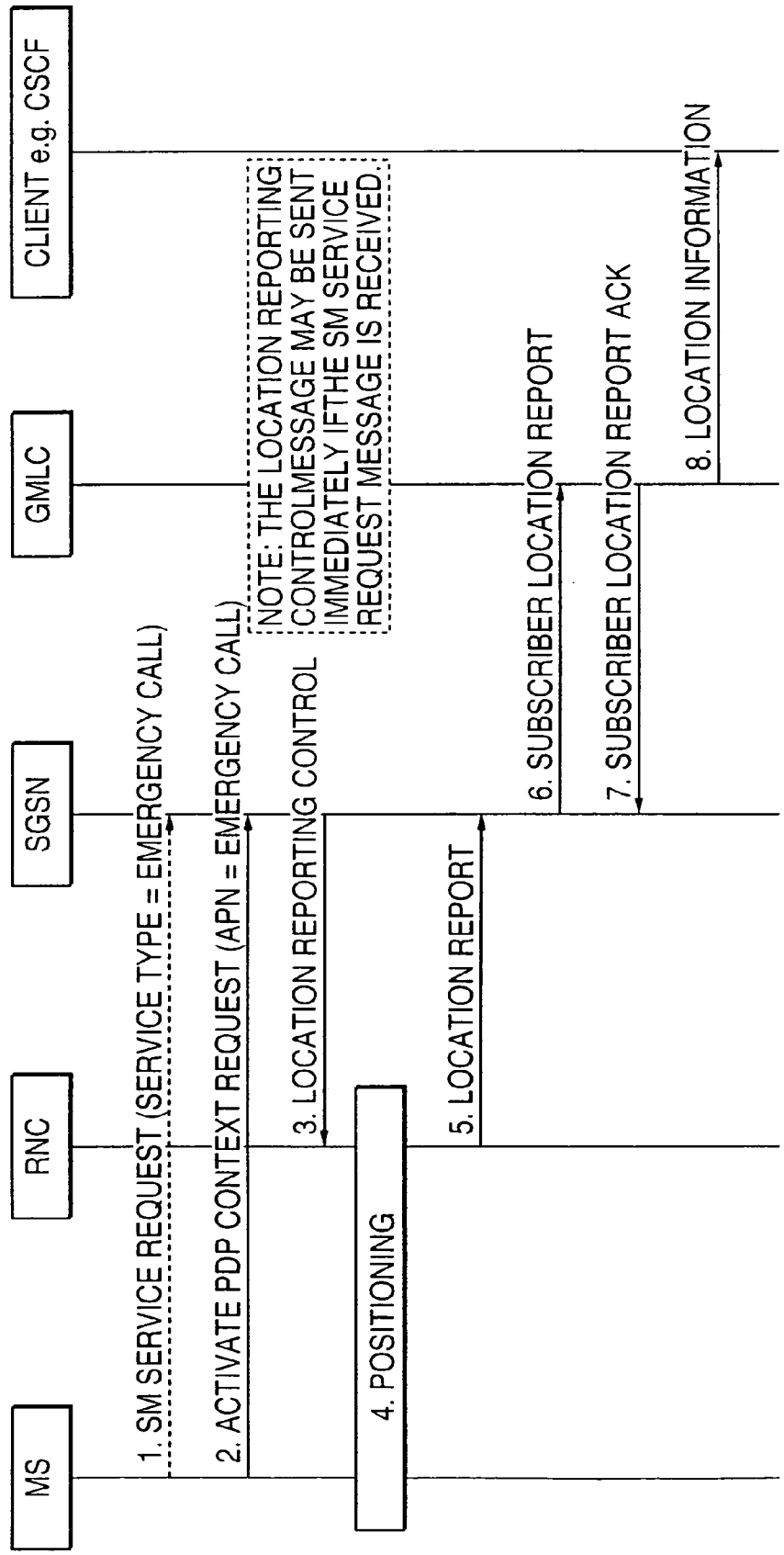
FIG. 6 is a signaling diagram of example embodiment of the invention in which the location information for an emergency call is obtained during the call.

Another example embodiment, in which a location calculation is triggered by the emergency call, is illustrated in FIG. 6. Like the other example embodiments, the embodiment in FIG. 6 takes advantage of the PDP Context available in UMTS networks. In particular, it may use the APN parameter of the Activate PDP Context Request to indicate that the call is to be serviced as an emergency call as indicated at step 2. Unlike the other example embodiments however, MT 100 sends an SM Service Request message before sending the Activate PDP Context Request as indicated at step 1. The SM Service Request message is sent to establish a secure signaling connection.

A key feature of the example embodiment in FIG. 6 is that SGSN 303 sends a Location Reporting Control message to the RNC 102 in response to the emergency call. Specifically, the SGSN 303 can initiate the location reporting procedure at step 3 immediately upon receiving the SM Service Request message where the parameter Service Type indicates an emergency call, or a request to activate a PDP context (the Activate PDP Context Request, the Activate Secondary PDP Context Request, or the Activate AA PDP Context Request) where the parameter APN indicates an emergency call. This feature has the advantage that location services are quickly performed for emergency calls, but are not unnecessarily performed for other types of calls.

The RNC 102 is responsible for calculating the location information for MT 100 at step 4. The location of MT 100 is reported to the SGSN 303 in step 5 and relayed to GMLC 106 at step 6. An acknowledgement of the location report is sent back to SGSN 105 at step 7 and then the location information is transferred to a PSAP selected by CSCF 304 either on request or independently at step 8.

Figure 7:
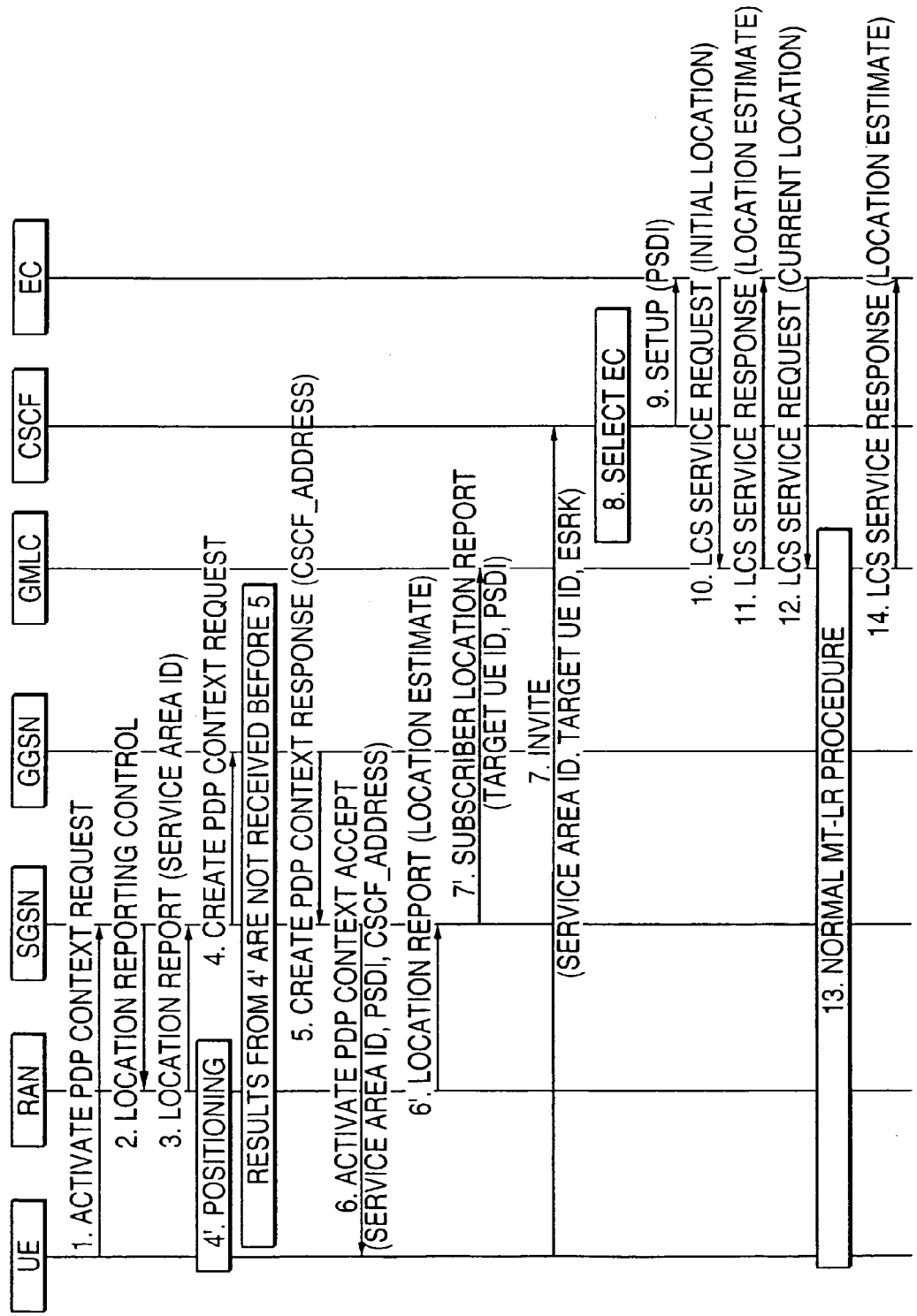
FIG. 7 is a signaling diagram of another example embodiment of the invention in which the location information for an emergency call is obtained during the call.

FIG. 7 illustrates an example method embodiment similar to that of FIG. 6 except that the Mobile Terminal 100 (referred to as "UE" in FIGS. 7-11) does not send a SM Service Request before sending the Activate PDP Context Request in step 1. SGSN 303 sends a location reporting control message (step 2), as soon as it receives the PDP context activation procedure (step 1), to request the Service Area ID from the Radio Access Network (UTRAN in the example network of FIGS. 1 and 2) and to start the positioning procedure (step 4'). This may, but need not, be done by sending two separate location reporting control messages to request the Service Area ID and to start positioning according to the current RANAP specification (3G TS 25.413). For an emergency call a temporary PS Domain identifier can be allocated. Such an identifier may be for example MS IP Address, PTMSI or MSISDN. SGSN 303 also assigns a PS Domain Identifier, to the emergency call that is used to identify (e.g. route to) both the emergency services provider and the switch in the VPLNIN currently serving the emergency caller, and possibly the emergency caller, for the duration of the call.

While carrying out positioning, the RAN 103 returns the Service Area ID to SGSN 303 (step 3). SGSN 105 sends a Create PDP Context Request to GGSN 203 as described above with respect to FIG. 3 (step 4). GGSN 303 accepts the request, modifies its PDP context table and returns a Create PDP Context Response message (including the address of suitable CSCF) to SGSN 105 (step 5). SGSN copies the CSCF address within an Activate PDP Context Accept message relayed to MT 100 along with the Service Area ID and the telephone number assigned to the emergency call (step 6).

When positioning is completed, RAN 103 returns a location estimate within a Location Report message to SGSN 105 (step 6'). SGSN 105 forwards a Subscriber Location Report (which includes the location estimate, an identifier (IMSI or IP address) and the assigned telephone number) to GMLC 106 (step 7'). Preferably, the location estimate is associated with a time stamp which, together, mark the "initial location" of MT 100. After the PDP context has been activate, MT 100 sends a Invite message (containing the Service Area ID, the identifier and the assigned telephone number) to CSCF 304 (step 7). Based at least in part on the Service Area ID, CSCF 304 selects a suitable PSAP (preferably using a database of PSAPs and their correspondence to Service Area IDs) and sends a setup message (containing the assigned telephone number) to PSAP 305 (FIGS. 7-11 refer to the PSAP as an EC (emergency center) rather than PSAP) (steps 8 & 9).

As soon as the emergency call is connected, the selected PSAP sends a LCS Service Request to obtain the initial location to GMLC 106 and GMLC 106 sends a LCS Service Response containing the initial location (steps 10 & 11). The emergency call is identified in the request and the response by its assigned telephone number (ESRK). Similarly, throughout the duration of the emergency call, the selected PSAP may request and receive updates on the current location of mobile terminal 100 using normal Mobile Terminated Location Requests (MT-LR) defined in 3G TS 23.171 v3.0.0 (Release 1999).

Figure 8:
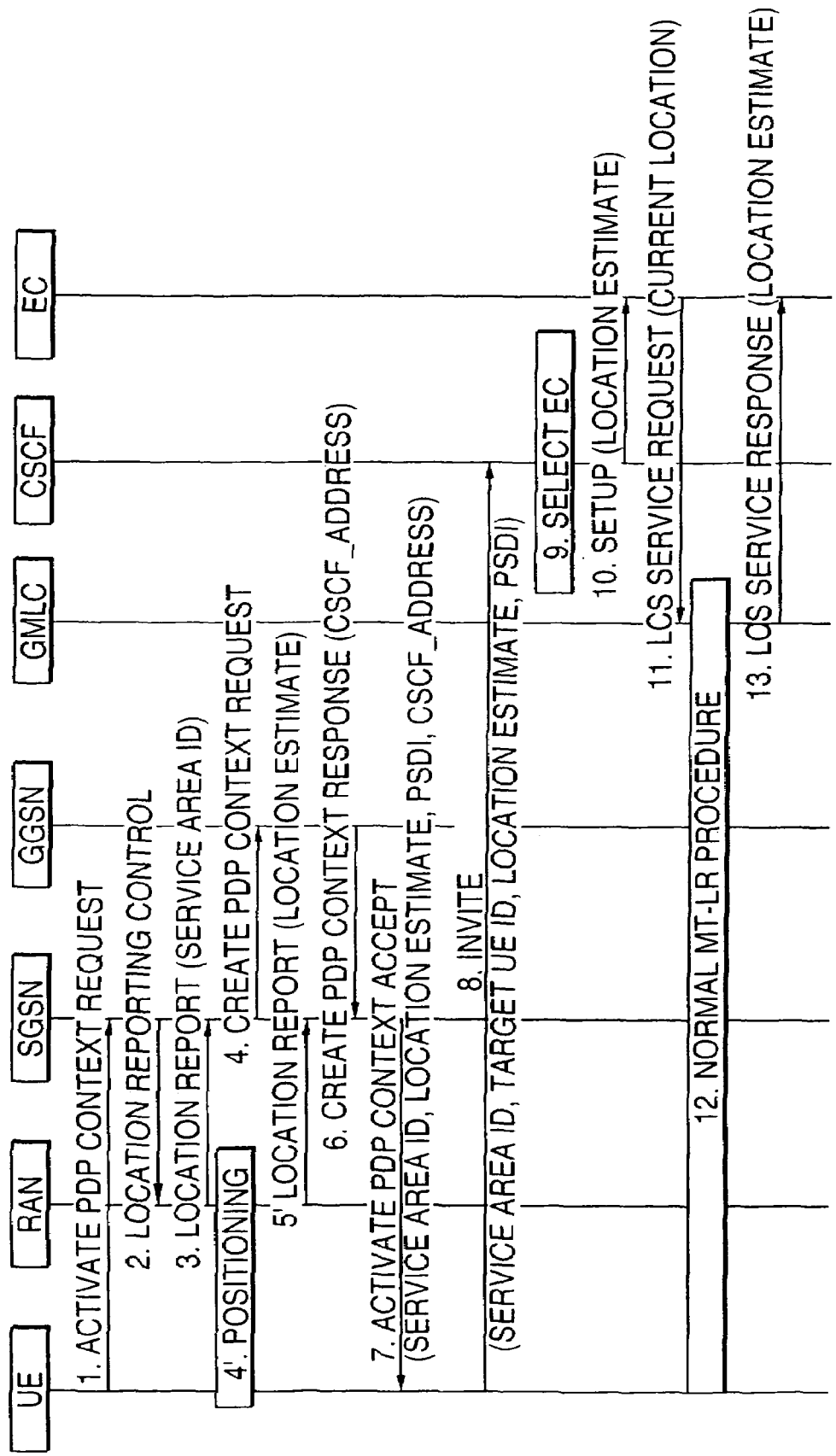
FIG. 8 is a signaling diagram of an example embodiment of the invention in which the location estimate is obtained before PDP Context Activation acceptance.

FIG. 8 illustrates a method similar to that in FIG. 7 except that the positioning procedure is finalized, and a location estimate is obtained, before PDP Context Activation acceptance. Steps 1-4 are the same as the method in FIG. 7. However, the SGSN 105 receives the Location Report (step 5'), containing the location estimate, from RAN 103 before GGSN 303 returns a Create PDP Context Response message to SGSN 105 (step 6).

Instead of forwarding the location estimate to GMLC 106 in a Subscriber Location Report (step 7' of FIG. 6), SGSN 105 includes the location estimate within the Activate PDP Context Accept message relayed to MT 100 along with the Service Area ID, assigned telephone number and CSCF address (step 7). MT 100, in turn, includes the location estimate (along with the Service Area ID, identifier, and assigned telephone) in the Invite message sent to CSCF 304 (step 8). After selecting the PSAP (step 9), CSCF 304 includes the location estimate in the setup message sent to PSAP 305 (instead of the assigned telephone number ESRK). This eliminates the need for the two steps for PSAP 305 to request and receive the initial location from GMLC 106 (steps 10 & 11 in FIG. 7) when the emergency call is connected. Of course, the selected PSAP may continue to request and receive updates on the current location of MT 100 in the same manner as in the example embodiment of FIG. 7 (steps 11-13).

Figure 9:
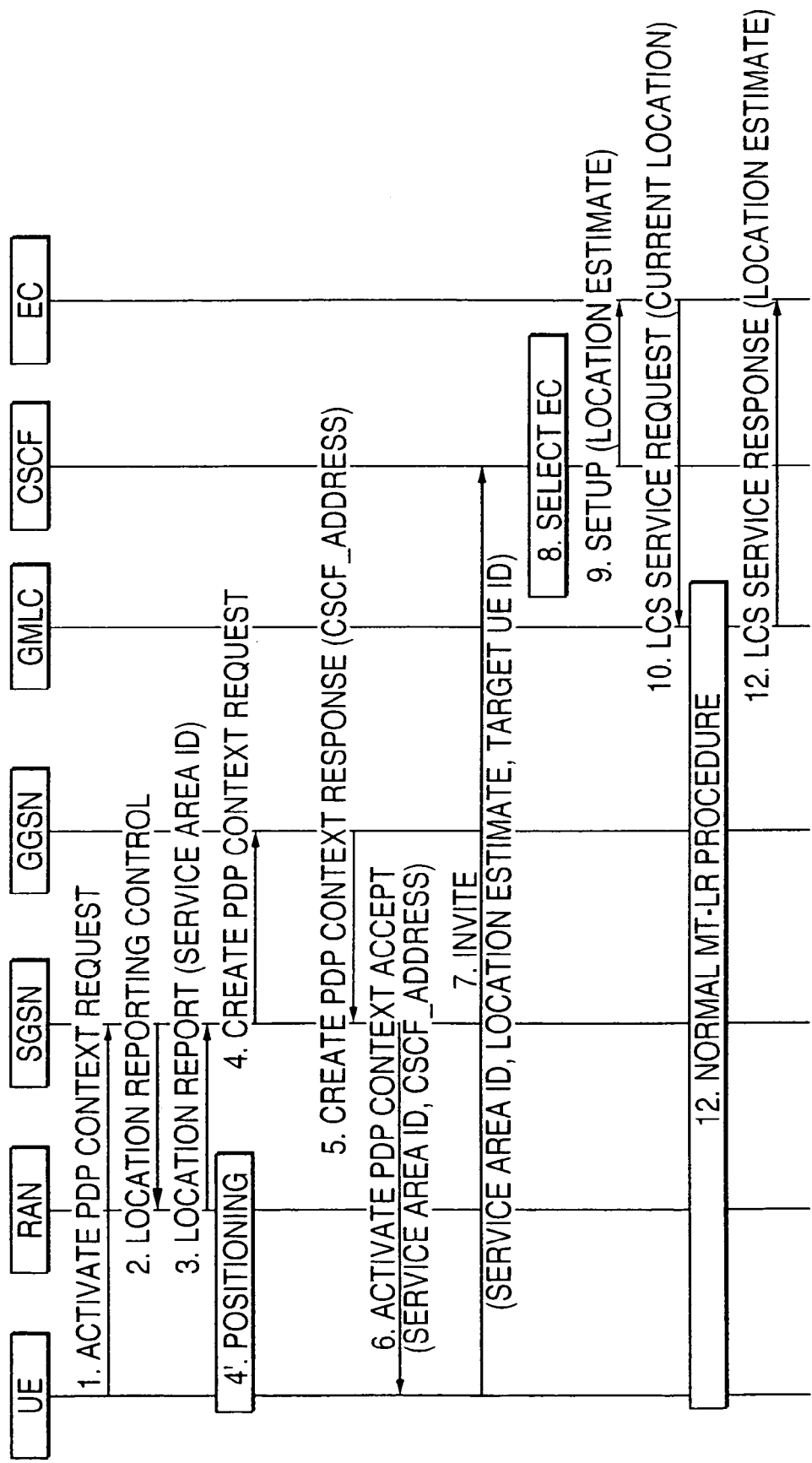
FIG. 9 is a signaling diagram of an example embodiment of the invention in which the location estimate is provided to the mobile terminal.

FIG. 9 illustrates a method embodiment similar to that of FIGS. 7 and 8, except that RAN 103 provides the location estimate to MT 100 instead of making a Location Report to SGSN 105. Steps 1-6 in the embodiment of FIG. 9 are the same as steps 1-6 in the embodiment of FIG. 7. MT 100 must receive the location estimate from 103 in some manner, perhaps, but not necessarily, by using Radio Resource Control (RRC) messages. The manner in which the location estimate is reported by RAN 103 (according to either the embodiment of FIG. 7 or the embodiment of FIG. 9) may be predetermined or it may be controlled, for example in the Location Reporting Control message sent by SGSN 105 to RAN 103 in step 2.

In the example embodiment of FIG. 9, the positioning procedure should be finished before the Activate PDP Context Accept message is received by MT 100 in step 6. If it is not, then MT 100 delays the Invite message until the location estimate is received from RAN 103. Once the location estimate is received, MT 100 sends an Invite message (containing Service Area ID, the location estimate and the identifier) to CSCF 304 (steps 7). The remainder of the steps in the example embodiment of FIG. 9 (steps 8-12) are the same as steps 9-13 in FIG. 17.

Figure 10:
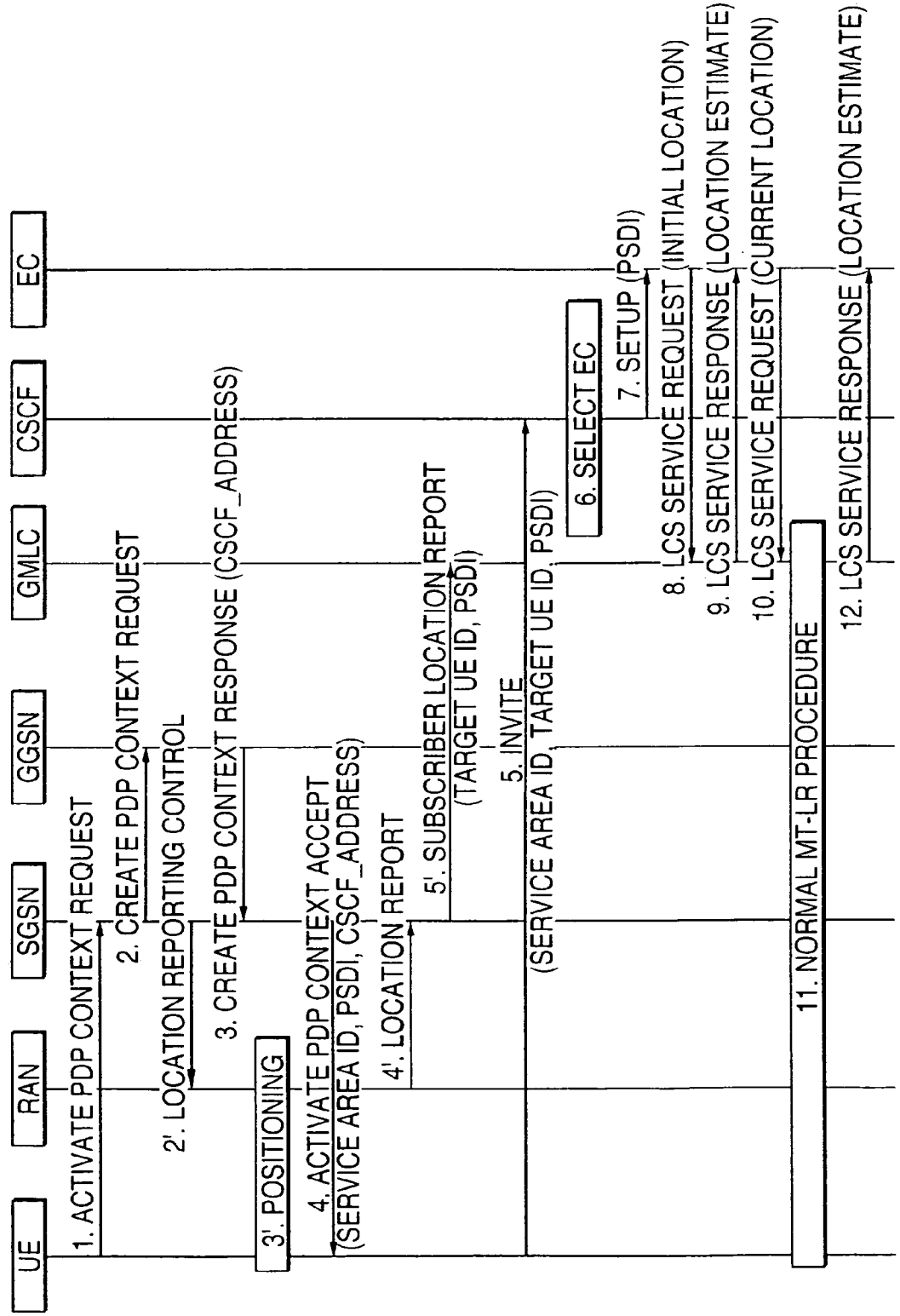
FIG. 10 is a signaling diagram of an example embodiment of the invention in which the SGSN knows the current Service Area Identification when it receives the Activate PDP Context Request.

FIG. 10 illustrates an example embodiment similar to that of FIG. 7 except that SGSN 105 already knows the current Service Area ID when it receives the Activate PDP Context Request in step 1. In such an embodiment, SGSN 105 need not request the Service Area ID from RAN 103 and RAN 103 need not return the Service Area ID as in steps 2 and 3 of FIG. 4. The remainder of the steps in the embodiment of FIG. 10 are the same as the remainder of the steps in FIG. 7.

Figure 11:
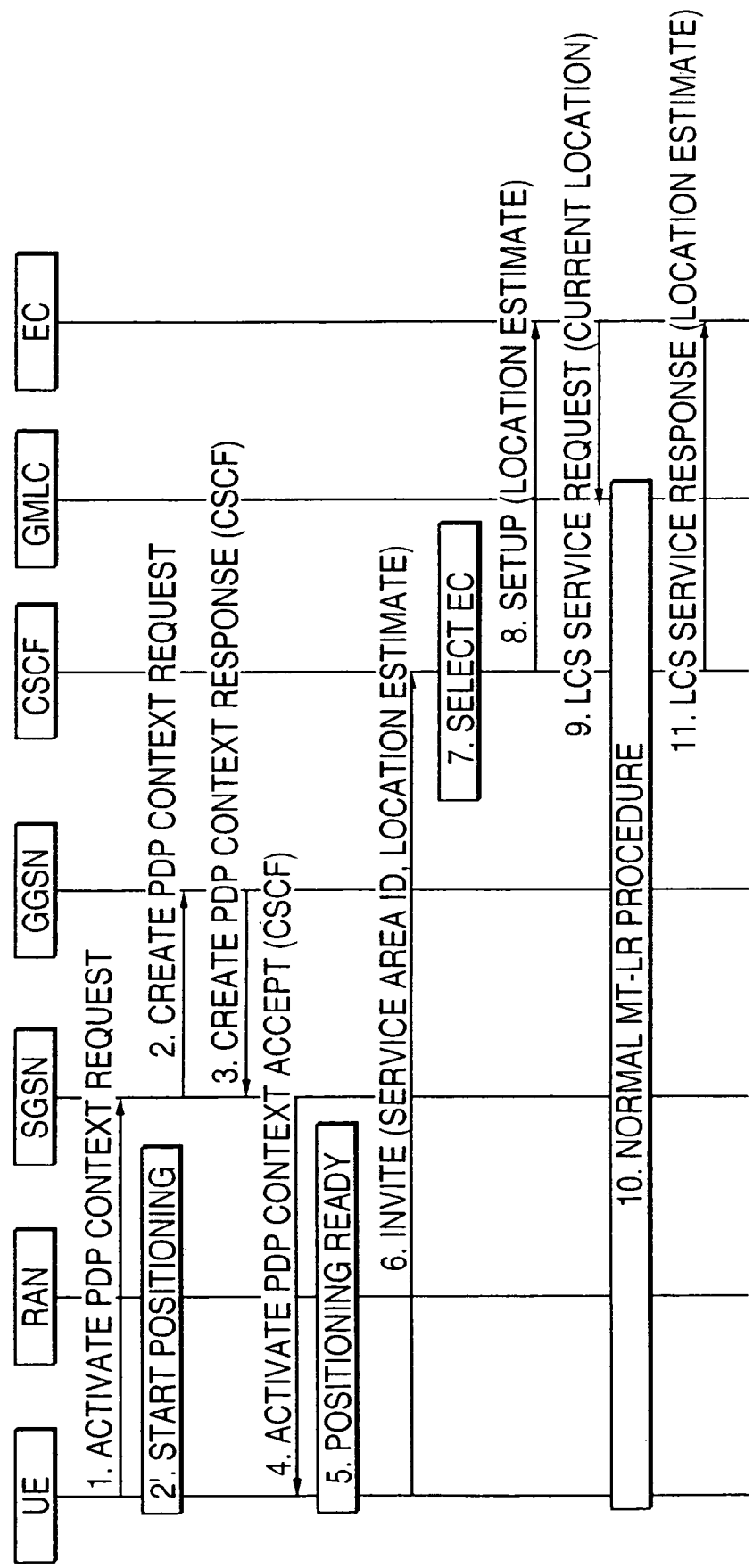
FIG. 11 is a signaling diagram of an example embodiment of the invention in which the mobile terminal originates the positioning method.

The example embodiment illustrated in FIG. 11 differs significantly from the other example embodiments insofar as MT 100 itself originates the positioning method (step 2') as soon as the Activate PDP Context Request is sent to SGSN 105 (step 1). It can either perform its own MT based positioning calculation or request that a positioning method be performed using Mobile Originated Location Requests (MO-LR) procedures. The example embodiment in FIG. 10 thus avoids the need for the Location Reporting Control message from SGSN 105 or the Location Report from RAN 103. It also simplifies the Activate PDP Context Accept message sent from SGSN 105 since it only needs to include the address of the CSCF (step 4). Similarly, the Invite message sent from MT 100 to CSCF 304 need only contain the location estimate and the Service Area ID (step 6). The service areas have to be coordinated between MT 100 and SGSN 105 in order to ensure that the Service Area ID provided by MT 100 is consistent with the Service Area ID expected by SGSN 105 and CSCF 304. The remainder of the steps in the example embodiment of FIG. 11 (steps 7-11) are the same as steps 9-13 in FIG. 9.

The example embodiments of FIGS. 7-11 show the a variety of methods, each with their own advantages and disadvantages. For example, in the example embodiments of FIGS. 7 and 10, the emergency call can be connected without regards to delays in the positioning procedure because the initial location is delivered by GMLC 106 upon request from PSAP 305 after the emergency call is connected. In the example embodiment of FIG. 10, the MT 100 must have a Subscriber Identification Module (SIM) in order to interface with CSCF 304.

While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

The invention claimed is:

1. A method comprising:
   receiving a first request to setup a communication channel for a call from a user equipment in a first network element, said first request having an indication that the communication channel will be used for transferring a call which requires location-based services; and selecting a second network element in accordance with said indication,
   wherein traffic on said communication channel is filtered according to filtering information set by said first network element or said second network element.

2. The method as recited in claim 1, further comprising:
   determining an identity of an entity in said second network element; and
   forwarding said identity to the user equipment.

3. The method as recited in claim 2, further comprising:
   returning an accept message from said first network element to said user equipment, said accept message acknowledging said first request; and
   providing an address of the entity to the user equipment.

4. The method as recited in claim 2, further comprising transferring said call to said entity.

5. The method recited in claim 1, wherein the first network element sends a second request to start location measuring to a location calculating entity when receiving said first request from said user equipment.

6. The method recited in claim 5, wherein the location calculating entity sends the measured location information to the first network element which forwards it further to a gateway mobile location center (GMLC).

7. The method recited in claim 1, wherein said second network element is a Gateway GPRS Support Node (GGSN).

8. The method recited in claim 1, wherein said first network element is a Serving General Packet Radio Service (GPRS) Support Node (SGSN).

9. The method recited in claim 4, wherein said second network element sets a traffic flow template (TFT) as filtering information in response to said first request to setup said communication channel.

10. The method recited in claim 1, wherein a parameter in said first request is used to indicate that said communication channel will be used for transferring an emergency call.

11. The method recited in claim 10, wherein said parameter in said first request is the Access Point Name (APN).

12. The method recited in claim 4, wherein said user equipment sends location information to said entity.

13. The method of claim 12, wherein said location information is Service Area Identification (SAI), Routing Area Identity (RAI), Cell-ID, coordinate information or any combination of these.

14. The method recited in claim 2 wherein said entity comprises an entity handling emergency calls.

15. The method recited in claim 14, wherein said entity handling said emergency calls requests location information from a gateway mobile location center (GMLC).

16. The method recited in claim 5 wherein said location calculating entity is a Radio Network Controller (RNC).

17. A network element configured to carry out a method comprising:
   receiving a request to setup a communication channel from a user equipment, said request having an indication that the communication channel will be used for transferring a call which requires location-based services; and
   selecting another network element in accordance with said indication,
   wherein traffic on said communication channel is filtered according to filtering information defined according to said indication.

18. A method comprising:
   providing location information for a first network element from a second network element in a radio access network;

sending a first request to setup a call from said first network element to a third network element, said request including said location information for the first network element; and selecting an entity handling emergency calls in a packet switched network based at least in part on said location information included in said first request.

19. The method recited in claim 18, further comprising transferring said emergency call to said selected entity.

20. A method comprising:
providing location information for a first network element from a second network element in a radio access network;

sending a first request to setup a call from said first network element to a third network element, said first request including said location information for the first network element, wherein a fourth network element indicates to the radio access network to start a positioning method in order to get a location estimate in response to receiving a second request from said first network element.

21. The method recited in claim 20, wherein the location estimate obtained by said positioning method is provided to a Gateway Mobile Location Centre (GMLC).

22. The method recited in claim 21, wherein said selected entity handling emergency calls obtains said location estimate from said Gateway Mobile Location Centre (GMLC).

23. The method recited in claim 22, wherein the call is identified using an assigned phone number when said selected entity handling emergency calls obtains said location estimate from said Gateway Mobile Location Center (GMLC).

24. The method recited in claim 20, wherein the positioning method is performed in the first network element.

25. A system comprising:
a user equipment (UE);
a radio access network (RAN);
a first network element in the radio access network, said first network element providing location information for said user equipment; and a second network element in a packet switched network, said second network element receiving a request from the user equipment to set up a call to said first network element, the request including said location information for the user equipment.

26. The system according to claim 25, wherein said second network element is a call state control function (CSCF) or a Public Safety Answering Point (PSAP).

27. The system according to claim 26, wherein said first network element receives a Serving Area ID and forwards said Service Area ID to said user equipment.

28. The system according to claim 27, further comprising a call control entity receiving said Service Area ID in an emergency call setup request from the user equipment.

29. The system according to claim 28, wherein said call control entity has a database identifying a plurality of Public Safety Answering Points (PSAPS) and corresponding said plurality of Public Safety Answering Point with Service Area IDs.

30. The system according to claim 28, wherein said call control entity selects a Public Safety Answering Point based, at least in part, on said Service Area ID.

31. The method as recited in claim 3, further comprising transferring said call to said entity.

32. The method recited in claim 10, wherein said parameter is said indication.

33. An apparatus configured to:
receive a request to setup a communication channel from a user equipment and a network element, said request having an indication that the communication channel will be used for transferring a call which requires location-based services, said apparatus being chosen to receive said request in accordance with said indication; and filter traffic on said communication channel according to filtering information defined according to said indication.

34. The apparatus of claim 33, wherein the apparatus is further configured to determine an identity of an entity handling emergency calls based on said indication.

* * * * *

UNITED STATES PATENT AND TRADEMARK OFFICE
CERTIFICATE OF CORRECTION

| | | |
|---|---|---|
| PATENT NO. | : 7,623,447 B1 | Page 1 of 1 |
| APPLICATION NO. | : 09/709716 | |
| DATED | : November 24, 2009 | |
| INVENTOR(S) | : Stefano Faccin | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2325 days.

Signed and Sealed this
Eleventh Day of January, 2011

David J. Kappos
*Director of the United States Patent and Trademark Office*